United States Patent

Olyphant, Jr. et al.

[15] 3,665,428

[45] May 23, 1972

[54] KEEPERED PLATED-WIRE MEMORY

[72] Inventors: Murray Olyphant, Jr., Lake Elmo; Michael David Cartier, North Saint Paul; Charles Robert Freeman, Lincoln Twp., Washington City., all of Minn.

[73] Assignee: Minnesota Mining and Manufacturing Company, St. Paul, Minn.

[22] Filed: Oct. 16, 1970

[21] Appl. No.: 81,285

[52] U.S. Cl...............340/174 JA, 340/174 VA, 340/174 TF, 340/174 PW, 340/174 QB, 340/174 BC

[51] Int. Cl.......................................G11c 11/14, G11c 5/02

[58] Field of Search...............340/174 PW, 174 GP, 174 TF, 340/174 VA, 174 JA; 339/17 E, 17 F

[56] References Cited

UNITED STATES PATENTS 3,281,825 10/1966 Carl et al..........................340/174 VA 3,371,326 2/1968 Fedde..............................340/174 VA 3,465,308 9/1969 Sasaki et al. ......................340/174 VA 3,456,247 7/1969 English.............................340/174 GP

OTHER PUBLICATIONS

IEEE Transactions on Magnetics, " Multilayer Processing for Magnetic Film Memory Devices," by Bertelsen, Vol. Mag. 3, No. 4, pp. 635–639.

*Primary Examiner*—Stanley M. Urynowicz, Jr.

*Attorney*—Kinney, Alexander, Sell, Steldt & Delahunt

[57] ABSTRACT

A plated-wire memory array, and a method of making the same, including a flexible integrally molded grooved keeper and word conductor combination having reinforcing material molded to the base of the keeper, plated bit wires in intimate contact with the keeper, and a ground plate.

6 Claims, 3 Drawing Figures

INVENTORS
MURRAY OLYPHANT, JR.
MICHAEL D. CARTIER
CHARLES R. FREEMAN
BY Kinney, Alexander,
Sell, Steldt & DeLaHunt
ATTORNEYS INVENTORS
MURRAY OLYPHANT, JR.
MICHAEL D. CARTIER
CHARLES R. FREEMAN
BY Kinney, Alexander, Sell, Steldt & DeLaHunt
ATTORNEYS

KEEPERED PLATED-WIRE MEMORY

BACKGROUND OF THE INVENTION

The present invention relates to a plated-wire memory array and a method of making it. More specifically the invention relates to a memory array comprising an integrally molded keeper and word conductor combination.

In a common form, a plated-wire memory includes a planar array of parallel, 5-mil diameter (or smaller) beryllium-copper wires having a 10,000 A. thick plating of 80–20 iron-nickel alloy on the surface. These plated-wires are commonly known as "bit wires." The plating is commonly done with current passing through the wire to produce a circumferential magnetic field which orients the domain structure of the magnetic coating during deposition. As a result of this orientation, the film of the magnetic alloy is anisotropic and has an easy axis of magnetization which is circumferential and a hard axis of magnetization which is in the axial direction. Whenever any section of the film is magnetized and the external magnetizing field is removed, the remanent magnetization in the film will lie with either clockwise or counterclockwise sense in the circumferential direction.

The other electrical elements of a plated-wire memory are designed to emplcy the alternative clockwise or counterclockwise sense in which the remanent magnetization can lie to enable the writing-in and reading-out of the binary "1" and "0" bits of the information to be stored.

In close parallel relationship with the plane of the bit wires, and orthogonal to them, there is provided a second planar array of parallel conductors which are flat copper strips commonly known as "word straps," "word drive conductors" or simply "word lines." Both the bit wires and word lines have return circuits which may all lie in a common ground plane.

The remanent circumferential magnetic flux in the magnetic plating links the bit wire circuit. Any change in this flux induces a voltage in the bit wire, thus the plated bit wire serves as its own sense line.

A "read" current in the word-strap establishes a magnetic field along the axial "hard" direction of the plated-wire that causes the magnetization of the film to turn toward alignment with the axial field. This rotation reduces the amount of magnetic flux which links the bit line circuit and causes a voltage pulse to be generated in the bit wire. The polarity of this voltage depends on the sense of the magnetization in the film and thus on whether the stored bit was a "1" or a "0." If the field produced by the word current is not too great the film magnetization returns in full strength to its original circumferential orientation when the word current is removed, thus leaving the stored bit intact for any subsequent read-cycle. This is nondestructive read-out (NDRO).

In writing, the plated-wire serves as its own bit drive wire. At the same time that the magnetization vector is partially rotated by a word-current field, a small current is driven through the bit wire. This bit current provides a circumferential field which steers the magnetization to the proper sense. The polarity of this current depends on whether the bit to be written is a "1" or a "0." Writing is thus a coincident-current operation in which the bit current must be large enough to switch the magnetization under a current carrying (active) word-strap but small enough not to switch the magnetization under the inactive word-straps.

Plated-wire magnetic film memories have demonstrated the frequently desirable characteristics of nondestructive read-out, very fast response, information retention without power, and easy adaptability to a wide range of applications and environments.

The present state of the art is exemplified by the "tunnel memory" structure which includes printed circuit word conductors (word lines) fabricated from copper clad dielectric film, a tunnel board formed from dielectric material and having a plurality of parallel-elongated apertures (tunnels) to receive the plated bit wires, and often a "keeper" structure of permeable magnetically soft material in the form of a continuous sheet or individual strips of iron-nickel alloy in back of the word lines. The present keeper structures are attempts to improve the magnetic flux coupling between any word line and the magnetic film on the bit lines at the point of crossing in order to reduce the word current required for write and read operations and to minimize interference between bits along a bit wire so that such bits can be packed more closely together.

This tunnel memory structure severely limits the possibilities for improving its electrical operating characteristics, for increasing the number of information bits which can be stored in a given array area, and for reducing the manufacturing cost so that the valuable features of a plated-wire memory can be made competitively available for the general memory market. Because of the limitations inherent in the tunnel structure, plated-wire memories have found substantial application only in specialized memory applications, particularly for military and aerospace use, where their nondestructive read-out, retention of information without power, high speed, and radiation resistance characteristics can justify their present high costs.

The factors which have up to now prevented the full utilization of plated-wire in the economical production of arrays with a high bit packing density, low drive current requirements, and reliably wide electrical operating tolerances are in large part traceable to basic limitations in the tunnel structure and to the impossibility of providing an optimally efficient keeper for use with such a structure.

With respect to tunnel memories, regardless of some variations in the method of construction, it is generally common practice to fabricate separate structures for supporting and positioning the plated wires and the word lines. These supporting and locating materials are molded or cast sheets of electrical insulating material and films of such materials. They have no other utility than to locate and provide support for the word and bit lines.

To be capable of practical manufacture such insulating supports must have some minimum cross-section. This minimum cross-section such as a tunnel wall, therefore undesirably sets a minimum for the spacing between word and bit conductors and between such conductors and a ground plane. Furthermore, because the plated-wires must be inserted after the tunnels are molded or cast the tunnels have to be substantially (commonly 60 percent) oversize. Because the plated-wire meanders throughout the length of the tunnel, the electrical characteristics of individual bits vary significantly.

It is recognized that in order to achieve higher densities of bit storage within an array, and to reduce the word drive currents, it is necessary to reduce all the physical spacings in the array and to achieve better magnetic coupling between the word current field and the bit storage section of plated-wire above it. In conventional structures the word lines can not be brought closer together without the field from one word line seriously disturbing the adjacent bit stored in the same bit wire (adjacent bit disturb). The bit lines can not be brought closer together because they can not be adequately shielded from the excessive mutual interference known as crosstalk. Shielding generally requires that the bit wires be located close to a ground plane which is prevented by the insulating supportive materials of the tunnel structure.

It has been mentioned that a magnetic keeper is desirable to provide better coupling of the magnetic field produced by the word current with the magnetic plating on the bit wire. Since optimization of keeper design is a basic purpose and achievement of the present invention the function of a keeper will be described in some detail.

The magnetic field around a long current carrying wire is, depending on geometry, generally inversely proportional to distance from the wire. The magnetic film of the plated-wire crossing over an energized word line thus experiences a magnetic field which varies along its length. The read voltage in the bit wire is proportional to the total flux change. In order to insure an adequate bit voltage the word current field must disturb the film magnetization over some required distance.

Since the word field extends beyond the required bit area it tends to disturb magnetization in the adjacent film. Also, since the word field reaches a peak within the required bit region this peak field is generally higher than required and can unnecessarily restrict the range over which the word current will read-out nondestructively.

The word current produces a net magneto motive force around any closed path enclosing the current. If part of the closed path is through magnetically permeable material and part through air, the magneto motive force per unit distance, which is the magnetic field strength, in the permeable material will be only a fraction of the field strength in the remaining air section of the path. This fraction is equal to unity divided by the relative permeability of the keeper. In order for the word current to cause a desired rotation of the film magnetization, the magneto motive force along the active bit length of the plated-wire must exceed some required value. The lower the magneto motive force over the remainder of the closed path which includes this length of plated-wire, the less the word current required to write and read the bit. It is evident that the magnetic circuit which connects the two ends of the active length of plated-wire through a U-shaped path enclosing the word line should most desirably pass entirely through magnetically permeable material. In the conventional tunnel structure, permeable material can be used only in back of the word line or at best partly enclosing it. The remainder of the path to the plated-wire is through conventional electrical insulating materials which have unity permeability like air.

The best way to achieve the complete high permeability path for the word flux is to eliminate all supporting dielectric materials from this path so that the permeable material can be formed into a U which encloses the word line and the ends of which make direct intimate contact with the plated-wire.

Doubly grooved keepers machined from physically hard rigid ferrite blocks have been proposed into which both the word lines and bit lines are later loosely inserted. Particular limitations of this approach, in addition to the problem of handling two sets of wires individually, are that the plated-wire can make only line contact with the notch in the hard keeper and to insure even this degree of contact the plated-wires are under overall pressure from a thin ground plane on the other side of which is a conformable pad to which external pressure is applied. Such means of pressure application can expose the entire wire including the memory storage section to bending which is intolerable because of the well known magneto-strictive strain sensitivity of plated wire. The size of arrays which can be fabricated from hard ferrite blocks is limited because such blocks can not be readily manufactured in large sizes and they are expensive to machine.

The prior art of thin film memory arrays has included attempts to incorporate flexible keepers by applying castable materials to already prefabricated and supported arrays of plated-wire memory elements and word lines.

Attempts to fabricate plated-wire memory structures using preformed grooved flexible keepers have heretofore been unsuccessful because of the difficulty of accurately and reliably positioning and bonding individual flat copper word lines to the soft rubber at the bottom of such keeper grooves. It has only been through the method disclosed in the present invention that it has become possible to realize the full benefits of a flexible keeper in a plated-wire memory.

THE PRESENT INVENTION

The apparatus of the present invention includes a moldable keeper having a base and at least two longitudinal parallel ridges upwardly projecting from the base defining a parallel groove therebetween, a word drive conductor molded within the keeper to form the bottom of the groove wherein the conductor is wider than the immediately adjacent width of the groove so that the conductor extends into adjacent ridges to interlock the conductor with the keeper, and reinforcing material affixed to the base to maintain the lateral dimensions of the keeper when subjected to external forces.

The present invention permits closer word conductor and bit line spacings to substantially increase bit storage densities. The use of a flexible keeper material and the molding thereof into the ideal U-shaped flux path provides optimum flux closure with no air gaps around the word line and enables writing and reading with greatly reduced word current. The direct intimate contact of the plated-wire with the keeper has proven to be an effective block against adjacent bit disturbance and creep. The precisely controlled position of the word conductor, which has a desirable flat-strip shape, in the main grooves of the keeper structure enables the elimination of insulating material otherwise used to prevent accidental electrical contact between bit and word conductors (which contact can have undesirable magneto strictive effects). It also makes possible a very close spacing of word conductor and bit lines which results in a desirable shortening of the flux path through the keeper and also enables a close approach of the word line to the ground plane and thereby also a desirable reduction of the inductance and impedance of the word conductor. This impedance can be still further reduced by the use of a sinuous word conductor. The flexibility of the keeper material enables intimate contact with the bit wire to be achieved over a substantial circumferential area bounding the active area of film without the undesirable magneto strictive effects which usually result from attempts to force intimate contact between memory films and hard keeper materials. Also, the conformability of the flexible keeper both during and after the insertion of plated-wires thereinto provides for maintaining contact to the wire by slight deformation of the keeper rather than of the wire or ground plane. A repairable memory in which a defective plated-wire can be readily replaced can be made by providing preformed notches in the keeper ridges into which the plated-wires are lightly pressed with a flat rigid ground plane to which external clamping force is applied. In this case, the wires are under very light pressure only in the regions of contact with the keeper and are not exposed to any bending force which could produce magneto-strictive effects.

In arrays of this invention all extraneous materials such as dielectric supports are eliminated since the keeper is itself a dielectric and also serves to locate and support both the word and bit lines. This fact, in addition to the simplified processing which the invention permits, and the reduction in the amount of material, particularly of expensive plated-wire, which is required to make an array for a given number of bits, can reduce the cost per bit of plated-wire memories so that their advantages can be economically utilized in memories of all sorts. The size of arrays which can be fabricated by this invention is limited only by available processing equipment and by the supply of long defect-free plated-wire.

This invention will become better understood by reference to the following detailed description when considered in connection with the accompanying drawings in which like numerals designate like parts throughout the figures and wherein.

Figures 1, 2:
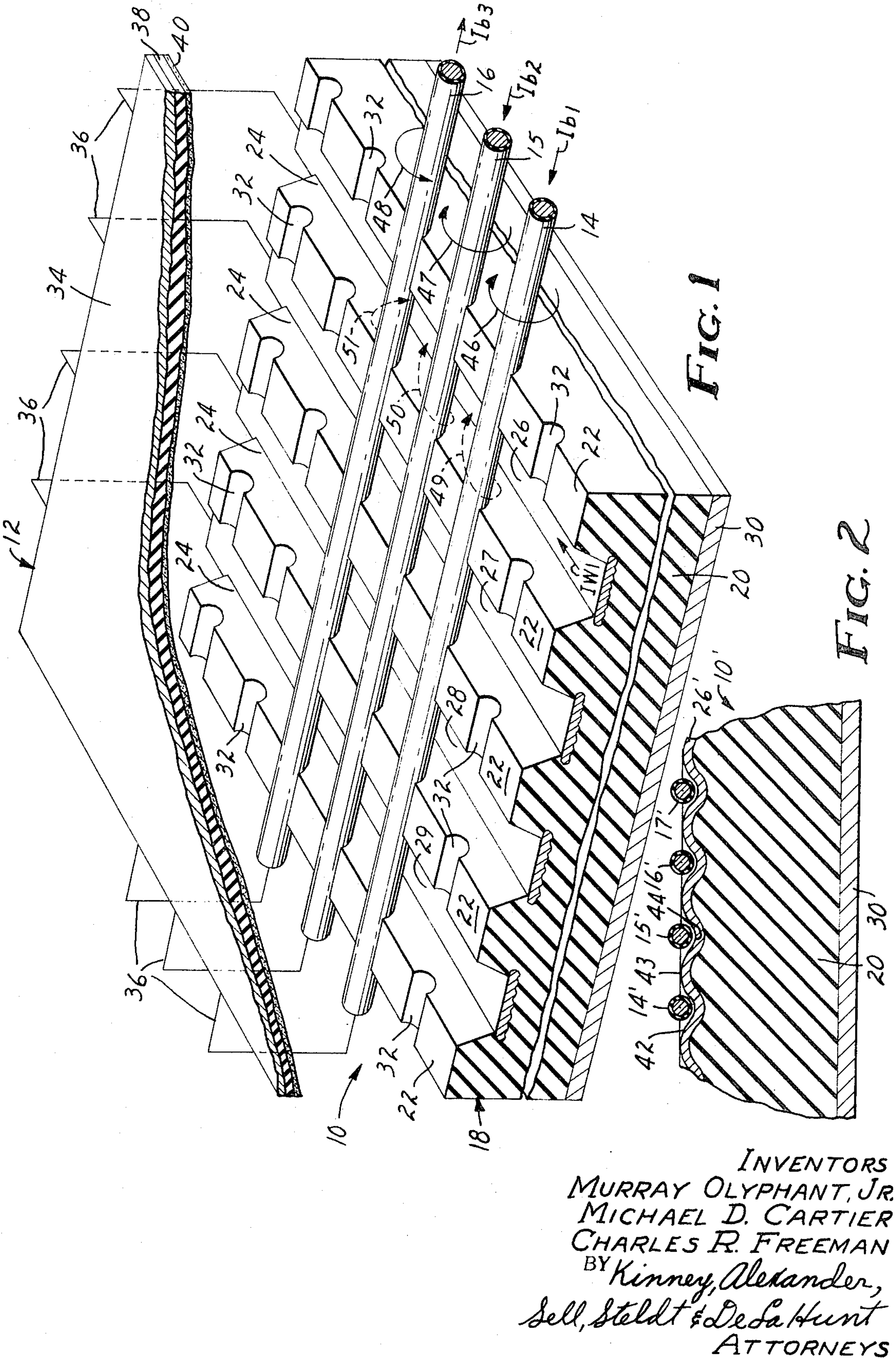
FIG. 1 is a partially exploded isometric view representing one embodiment of the present invention illustrating a plated-wire memory array of this invention.
FIG. 2 is a cross-sectional view illustrating a second embodiment of this invention.

The first embodiment illustrated in FIG. 1, generally designated as a plated-wire memory array 10, includes an integrally molded keeper and word conductor combination, an electrically conductive (e.g., copper) ground plane 12 and plated bit wires 14, 15, 16.

The keeper and word conductor combination includes a keeper 18 of moldable-flexible solid dielectric material, interspersed with magnetically soft ferrite particles, shaped into a base and longitudinal parallel ridges 22 upwardly projecting from the base and defining parallel grooves 24 therebetween. The combination also includes plated copper word drive conductors 26, 27, 28, 29 molded within the keeper 18, between the ridges 22, to form the bottom of each groove 24. Each conductor 26, 27, 28, 29 being wider than the immediately adjacent width of the groove, extends into adjacent ridges 22 to interlock the conductors in the keeper 18. Glass cloth reinforcing material 30 is molded into the bottom surface of the base to maintain the lateral dimensions of the keeper such as when the keeper and word conductor combination is being removed from a mold during the manufacture of the combination.

Notches 32, each having a bottom surface at a precise and uniform distance above the conductors, 26, 27, 28, 29, may be molded in the ridges 32 during the molding operation of the keeper-word conductor combination. Such notches 32 are substantially orthogonal relative to the conductors 26, 27, 28, 29. Plated bit wires 14, 15, 16 may be placed in the notches 32 and held in intimate contact with the surface of the notch by a suitable clamping force between the ground plane 12 and the base of the keeper 18. This clamp-hold assembly permits removal of the ground plane 12 for subsequent replacement of defective bit wires to result in a repairable memory array.

The ground plane 12 includes a sheet of electrically conductive material 34, e.g., copper, electrically connected to the conductors 26, 27, 28, 29 and bit wires 14, 15, 16 by suitable wires 36, and a thin film of electrically insulating material 38 to prevent electrical contact between the bit wires 14, 15, 16 and the sheet 34 throughout the length of the bit wires 14, 15, 16. The ground plane 12 may also include a layer of pressure-sensitive adhesive 40, utilized to position the bit wires on the ground plane especially during the assembly of the memory array when notches 32 are not provided within the upward surfaces of the ridges 22.

The conductors 26, 27, 28, 29, may be plated to provide a flat upper surface, as shown in FIG. 1, or each conductor may be plated to provide a sinuous upper surface 42, as shown in FIG. 2. The sinuous surface 42 of the conductor 26', having raised surfaces 43 between the bit wires 14', 15', 16', 17' and depressed surfaces 44 adjacent to and under the bit wires 14', 15', 16', 17'. This sinuous surface 42 permits the conductor 26' to be placed closely adjacent to the ground plane 12' to reduce the impedance of the conductor 26'. The ground plane 12' of the second embodiment illustrated in FIG. 2 has not been shown for the sake of brevity.

EXAMPLE

Figure 3:
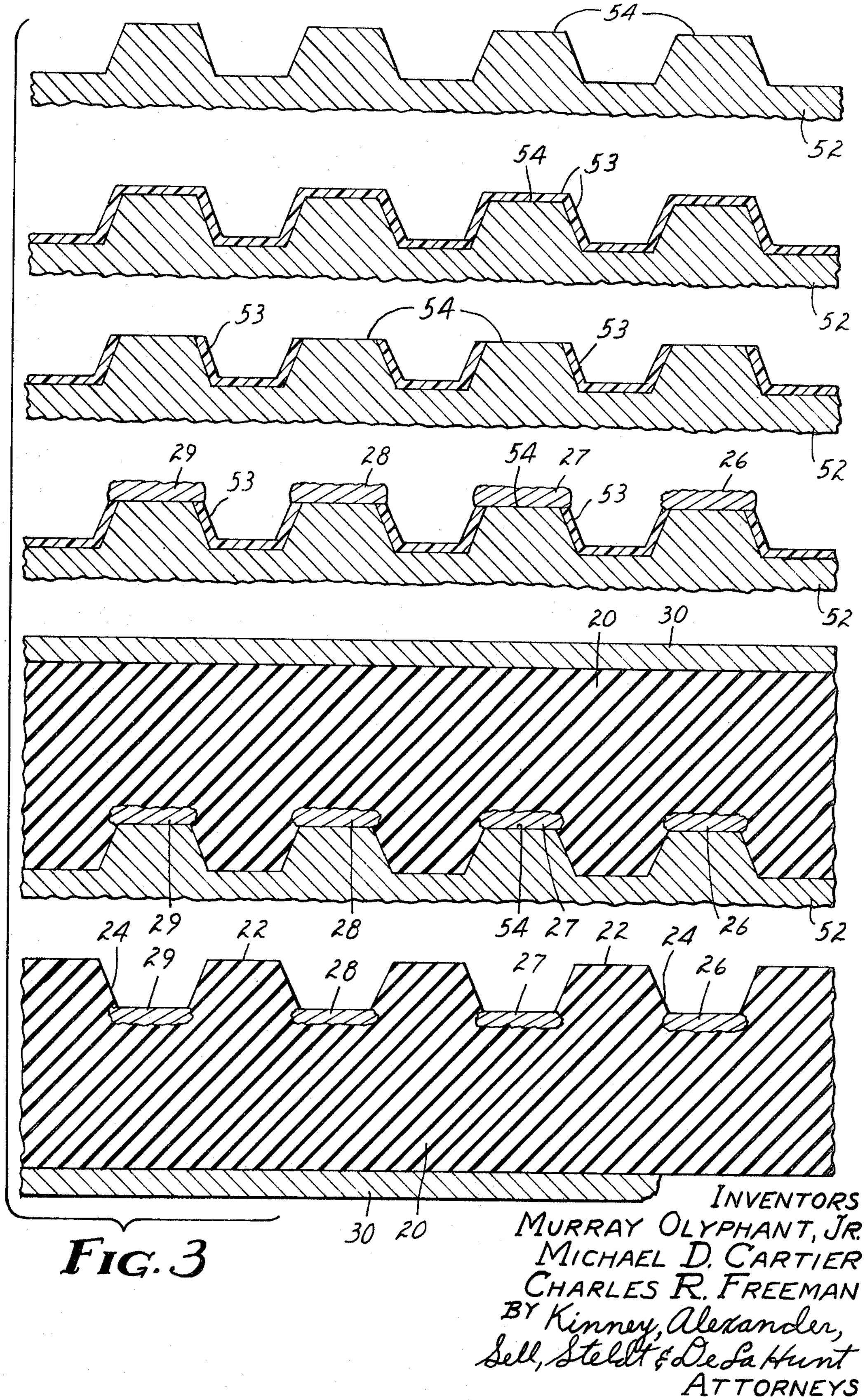
FIG. 3 is a diagrammatic representation of various manufacture stages of an integrally molded keeper and word conductor combination in accordance with the teachings of the present invention.

The plated-wire memory array may be produced as follows; reference will be made to the components of FIG. 3. A stainless steel mold 52 with 5-mil high strips and 8-mil wide lands on 20 mil centers is cleaned with toluene in an ultrasonic cleaner and buffed, the mold 52 is then dipped into a resist solution of approximately 20 percent by weight of poly(n-butylmethacrylate) in methyl ethyl ketone (MEK) to form a resist coating 53. After the solution has dried on the mold, the lands 54 are cleaned in preparation for the plating process. The copper word conductors 26, 27, 28, 29 are plated onto the lands 54 by dipping the mold 52 in a plating bath for 45 minutes at approximately 23 amps per square foot resulting in a copper coating of approximately a 1-mil thickness. The mold is then soaked in MEK to remove the remaining resist coating 53. Electrical grade reinforcing glass cloth 30, cut to the approximate size of the mold, is centered on a bottom steel plate having flat ground parallel faces. Ferrite-filled rubber material 20, cold calendered to a thickness of 25 mils with a maximum variation of ± 0.0005 inches, is aligned on top of the glass cloth 30. The mold 52 is placed on the ferrite-filled rubber material 20 and this entire stack (including the mold 52, conductors, material 20, cloth 30) is placed in a hydraulic press with electrically heated flat parallel platens at approximately 160° C. The stack is allowed to heat for 10–20 minutes and then a molding pressure of approximately 3,000 pounds per square inch is applied for 4 minutes. The stack is then removed from the press and allowed to cure in an oven at 155° C. for 30 minutes. The mold 52 and the entire stack is then allowed to cool to 30° C. after which the stack is disassembled and the ferrite-filled rubber material 20 with the word conductors 26, 27, 28, 29 and reinforcing glass cloth 30 now embedded therein is carefully lifted and fastened to a 1 ½ inch diameter roller and rolled off the mold parallel to the grooves 24 containing the word conductors 26, 27, 28, 29. The flexible molded keeper and word conductor combination is then gently unrolled to return the combination to its molded shape. The thickness of the molded sheet including the ridges is precisely measured with a suitable dead weight micrometer.

A rigid plastic holding block having parallel grooves of a depth equal to the diameter of the plated-wire (2.5 mils) and a width slightly exceeding the diameter of the plated-wire and a center-to-center spacing of 10 mils, receives the plated bit wires into the grooves. A sheet of 1 mil copper foil having a half mil insulating coating of polyimide resin secured to one surface thereof and a 1 mil layer of pressure-sensitive polyacrylate adhesive applied and cured to the insulating sheet is then applied to the holding block with the adhesive layer adjacent to the bit wires. The ground plane is then removed from the holding block, with the bit wires secured to the adhesive coating, and properly positioned with respect to the keeper to place the bit wires orthogonally to the plated word conductors. This assembly is placed on an oversize steel block at least 1 inch thick with a flat ground upper face, and positioned so that the block extends beyond the array at least 1 inch on each side. Four strip-shaped stops one-half inch wide and of lengths equal to the edge lengths of the keeper are then laid up on each side of the keeper from strips of calipered shim stock to a height approximately equal to the thickness of the keeper. The precise thickness is determined by test pressings to give the desired controlled embedment of the plated-wire. A second flat ground steel block is positioned over the stops and assembly and the whole is placed in a heated press. The assembly is then heated to 180° C. for 15 minutes. Next a pressure of 500 psi is uniformly applied for 5 minutes to form the bit wires into the keeper material.

In operation, when current $Ib_1$, $Ib_2$ and $Ib_3$ is applied to the bit wires, the direction of magnetization of the plated film is shown by the solid arrows 46, 47, 48 for a 1–1–0 pattern, respectively. When drive current $Iw_1$ is applied to the word conductor 26 the resultant magnetic field between the conductor 26 and ground plane 12 causes the direction of the magnetization in the plated film to be rotated toward the axis of the bit wires as shown by dotted arrows 49, 50, 51. The resultant change of magnetic flux linking the bit wires induces negative, negative and positive voltage polarities in the bit wires 14, 15, 16, respectively.

While two embodiments have been described in detail, it is appreciated that this was for the purpose of illustration and that additional embodiments could be made without departing from the spirit and the scope of the invention as set forth in the appended claims.

What is claimed is:

1. An integrally molded keeper and word conductor combination having particular utility in a plated-wire memory array, said combination comprising
   A. a molded keeper of a flexible solid dielectric material loaded with magnetically soft ferrite particles and having a base and at least two longitudinal parallel ridges upwardly projecting from the base defining a parallel groove therebetween;
   B. a word drive conductor molded within said keeper between said ridges to form the bottom of said groove to precisely establish a desired distance from the top of said conductor to a plane defined by the upper surfaces of the two adjacent said ridges, said conductor being wider then the immediately adjacent width of said groove so that said conductor extends into adjacent said ridges to interlock said conductor into said keeper; and
   C. reinforcing material affixed to said base to maintain the lateral dimensions of said keeper when subjected to external forces.

2. An integrally molded keeper and word conductor combination according to claim 1 wherein each of said two longitudinal parallel ridges includes at least one notch, both of said notches extending downwardly from said plane to receive and align bit wires substantially orthogonal relative to said word drive conductor.

3. An integrally molded keeper and word conductor combination according to claim 1 wherein said top of said conductor is a uniform distance from said plane for the length of said conductor.

4. An integrally molded keeper and word conductor combination according to claim 1 wherein said top of said conductor defines a sinuous surface having depressed areas adjacent to bit wires in a plated-wire memory array.

5. A plated-wire memory array comprising

A. an integrally molded keeper and word conductor combination including 1. a molded keeper of a flexible solid dielectric material loaded with magnetically soft ferrite particles and having a base and at least two longitudinal parallel ridges upwardly projecting from the base defining a parallel groove therebetween;

2. a word drive conductor molded within said keeper between said ridges to form the bottom of said groove to precisely establish the desired distance from the top of said conductor to a plane defined by the upper surfaces of the two adjacent said ridges, said conductor being wider than the immediately adjacent width of said groove so that said conductor extends into adjacent said ridges to interlock said conductor into said keeper;

3. reinforcing material affixed to said base to maintain the lateral dimensions of said keeper when subjected to external forces;

B. a ground plane positioned adjacent to said plane and electrically connected to said word drive conductor; and C. at least one bit wire positioned between said keeper and word-strap combination and said ground plane and aligned substantially orthogonally relative to said word drive conductor.

6. A plated-wire memory array according to claim 5 wherein each of said two longitudinal parallel ridges includes at least one notch, said notches extending downwardly from said plane to receive and align bit wires substantially orthogonal relative to said word drive conductor.

* * * * *